United States Patent [19]
Beers et al.

[11] Patent Number: 5,913,075
[45] Date of Patent: Jun. 15, 1999

[54] HIGH SPEED COMMUNICATION BETWEEN HIGH CYCLE RATE ELECTRONIC DEVICES USING A LOW CYCLE RATE BUS

[75] Inventors: Gregory Edward Beers, Austin; Richard Francis Frankeny, Elgin; Mithkal Moh'd Smadi, Round Rock, all of Tex.

[73] Assignee: International Business Machines Corporation, Armonk, N.Y.

[21] Appl. No.: 08/823,820

[22] Filed: Mar. 25, 1997

[51] Int. Cl.$^6$ ........................................ G06F 13/00
[52] U.S. Cl. ..................... 395/889; 395/878; 341/126
[58] Field of Search ...................... 395/878–891, 395/555–567; 341/126 T, 155; 375/7; 326/30

[56] References Cited

U.S. PATENT DOCUMENTS

| | | | |
|---|---|---|---|
| H1342 | 8/1994 | Whitesell . | |
| 3,680,051 | 7/1972 | Blessin et al. | 375/357 |
| 3,980,993 | 9/1976 | Bredart et al. | 395/556 |
| 4,092,639 | 5/1978 | Schoeff | 341/154 |
| 4,107,668 | 8/1978 | Henry | 341/111 |
| 4,153,873 | 5/1979 | Grindheim | 324/679 |
| 4,195,235 | 3/1980 | Schoeff | 327/103 |
| 4,245,305 | 1/1981 | Gechele et al. | 395/845 |
| 4,468,737 | 8/1984 | Bowen | 395/878 |
| 4,486,833 | 12/1984 | Daudelin | 395/878 |
| 4,524,417 | 6/1985 | Kimoto | 395/878 |
| 5,055,844 | 10/1991 | Kasai | 341/144 |
| 5,115,450 | 5/1992 | Arcuri | 375/7 |
| 5,373,292 | 12/1994 | Yasuda | 341/108 |
| 5,471,632 | 11/1995 | Gavin et al. | 395/284 |
| 5,504,927 | 4/1996 | Okamoto et al. | 395/878 |
| 5,507,001 | 4/1996 | Nishizawa | 395/825 |
| 5,706,007 | 1/1998 | Fragnito et al. | 341/155 |
| 5,760,601 | 1/1998 | Frankeny | 326/30 |

*Primary Examiner*—Christopher B. Shin
*Attorney, Agent, or Firm*—Casimer K. Salys

[57] ABSTRACT

A system and method for communicating information from a high speed digital device, such as a processor, to a high speed peripheral device over a bus which has a frequency capability materially lower than the clock rates of the respective sending and receiving devices. Multiple successive digital signals are latched, converted to analog format current source signals, transmitted over the bus in analog format, decoded into respective digital format signals at the receiving end of the bus, and sequentially provided to the peripheral device in the original order. Analog to digital and digital to analog conversion accuracy is maintained through the use of a linking current reference which defines at each end of the bus a reference signal suitable for mirrored replication. The current mirrors allow accurate integrated circuit device dimension controlled current generation and corresponding current level decoding.

21 Claims, 8 Drawing Sheets

HIGH SPEED COMMUNICATION BETWEEN HIGH CYCLE RATE ELECTRONIC DEVICES USING A LOW CYCLE RATE BUS

CROSS-REFERENCE TO RELATED APPLICATIONS

The present application is related to U.S. patent applications having Ser. No. 08/703,317, filed Aug. 26, 1996, now patented, U.S. Pat. No. 5,793,223; Ser. No. 08/703,318, filed Aug. 26, 1996, now patented, U.S. Pat. No. 5,760,601; Ser. No. 08/770,602, filed Dec. 19, 1996; and Ser. No. 08/770,603, filed Dec. 19, 1996, now patented, U.S. Pat. No. 5,815,107. The subject matter thereof is incorporated herein by reference. All the applications are assigned to the assignee of the present application.

FIELD OF THE INVENTION

The present invention relates generally to the conversion of signals between digital and analog formats to optimize data transmission over a frequency limited bus. More particularly, the invention is directed to grouping and converting digital signals into multilevel analog signals for current source based transmission over a bus, and related reconversion to digital format at the receiving end of the bus.

BACKGROUND OF THE INVENTION

Integrated circuit processor and peripheral device speeds, which for digital systems are conventionally measured by clock rate, having increased to levels where they routinely exceed the data transfer rate capabilities of the buses in the computer systems within which the devices most frequently appear. Therefore, the computer system level bus, and even more so the input/output (I/O) bus, clock capabilities bound communication between the processors and the peripherals in advanced computers. This is not unexpected in that the I/O bus typically is at the level of the printed circuit board, and as such exhibits inductance and capacitance of values materially greater than the lines within integrated circuit devices. Contention for board real estate and the input/output pins of integrated circuit devices precludes increases of the I/O bus size as a solution to the clock rate limitation.

Therefore, as generally shown in FIG. 1, what is needed is a bus interface design which in the simplest form allows a processor operating at a high clock rate to transmit and receive data at its clock rate from a peripheral operating at an analogous clock rate over a bus having a clock rate capability materially lower than the transmitting and receiving devices, namely, the processor and peripheral operating in one or the other functions. Of course, the objective must be accomplished so that the information at the processor and peripheral ends can be transmitted or received in a digital format.

The use of current sources to simultaneously transmit high frequency signals over lines bidirectionally is described in U.S. Pat. Nos. 5,578,939 and 5,568,064, the subject matter of which is incorporated herein by reference. Refinements in current source drivers and reference generators associated therewith are described in the U.S. patent applications having Ser. Nos. 08/703,318 and 08/703,317, both filed on Aug. 26, 1996. Applications and refinements of current source driven multilevel signals appear in the aforementioned U.S. patent applications having Ser. Nos. 08/770,602 and 08/770,603, both filed on Dec. 19, 1996.

SUMMARY OF THE INVENTION

The use of a relatively low frequency capability bus to transmit data between relatively high frequency operation devices is accomplished through the use of an architecture comprising a means for providing digital signals at a first cycle rate, means for latching the digital format signals for multiple successive cycles, means for converting latched digital format signals into multilevel analog format signals, means for sending the analog format signals from a transmitting end of a bus to a receiving end of the bus, the bus characterized in having a maximum operating frequency materially less than the first cycle rate, means for converting analog format signals received from the bus into received digital format signals distributed over multiple successive cycles, and reference current transmitted over a reference line connecting the means for converting latched digital format signals to the means for converting analog format signals. In other forms, the invention relates to the method practiced by the preceding apparatus and to a particularized bus architecture for connecting a processor to a peripheral having the characterized clock frequency relationships.

In a particularized implementation, the architecture is directed to a reference generator, current source drivers, latches, and processor resident on common integrated circuit chip and operable in a digital format, and a reference replicator, multilevel converter, multiplexer, and peripheral operable on a separate integrated circuit chip in a digital format, interconnected through a bus operable in an analog mode and joined by a current reference line extending between the reference generator and the reference replicator.

These and other features of the invention will be more clearly understood and appreciated upon considering the detailed embodiments described hereinafter.

DESCRIPTION OF THE PREFERRED EMBODIMENT

Figure 1:
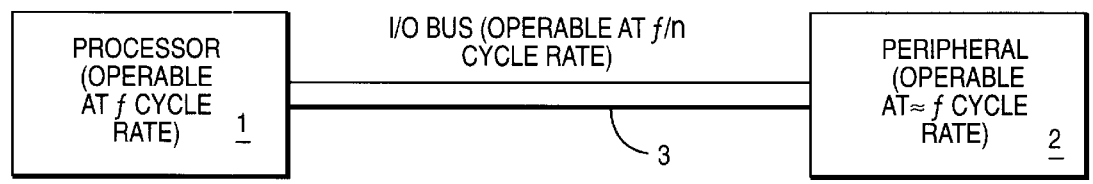
FIG. 1 is a schematic functionally depicting the relationship of the bus to processor and peripheral devices in the context of clock rates.

FIG. 1 schematically depicts by functional elements the underlying objective of the invention. Namely, a need exists for increasing the data transfer rate over a clock frequency limited input/output I/O bus 3. In the embodiment, processor 1 operating at a clock rate of "f" and peripheral 2 operating at a clock rate approximately "f" are interconnected through bus 3, which bus 3 is characterized as having electrical characteristics allowing a clock rate materially less than "f". Though the application contemplates data transmission from processor 1 to peripheral 2, it should be readily apparent that the reverse direction of transmission is accomplishable through a duplication of the transmission and receiving elements.

As noted earlier, the problem typically arises in the context of computer systems in which the integrated circuit devices associated with the processor and the integrated circuit devices associated with the peripherals have a clock rate capability materially faster than the printed circuit board wiring inductance and capacitance constraints allow for the bus itself. A similar need arises when the underlying objects are driven by the need to lower the integrated circuit pin counts for the same bandwidth, a higher bandwidth for the same bus cost, or a reduction in bus arbitration complexity for bidirectional bus transmission. The present invention addresses and overcomes this problem by operating the bus in a multilevel analog mode to simultaneously transmit groups of digital signals from successive clock cycles, whereby the simultaneous multilevel analog transmission of grouped digital signals offsets the lower clock rate capability of the bus.

In the context of the present invention, the system in FIG. 1 operates in a serial to analog parallel and back to serial format. Two serial bits of digital format data are received, converted to analog format, transmitted in analog format at a lower frequency rate over the bus, received in analog format at the lower frequency rate, converted to digital format, and clocked out as two serial bits of digital format data at a higher frequency rate.

Figure 2:
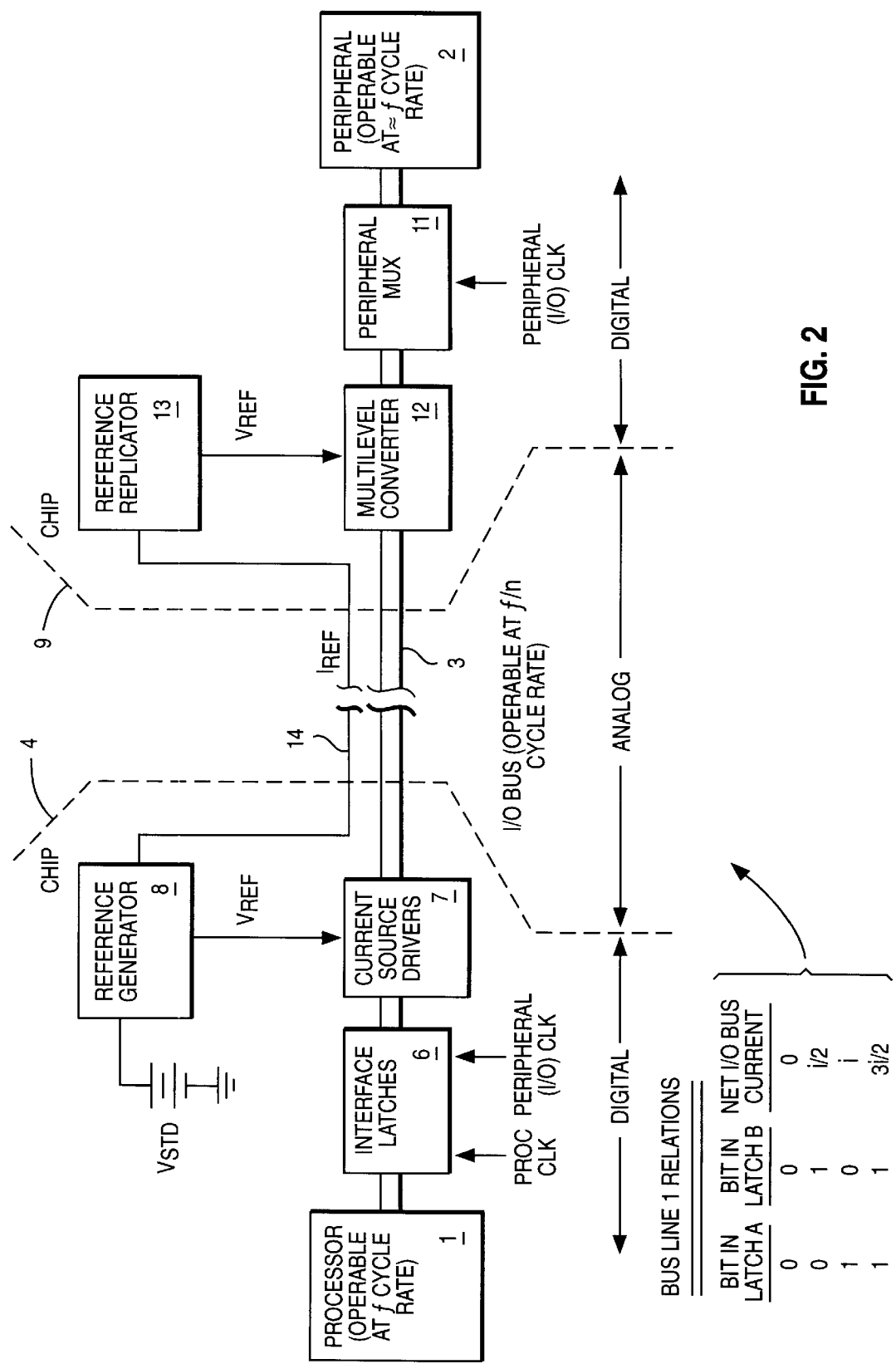
FIG. 2 is a schematic diagram of functional blocks providing multilevel analog information transmission over a bus from a digital processor to a digital peripheral.

FIG. 2 schematically illustrates by functional blocks an embodiment of the present invention in the context of one directional transmission over I/O bus 3. As embodied in FIG. 2, processor 1 is on a common integrated circuit chip, generally 4, with interface latches 6, current source drivers 7, and reference generator 8. Operations performed on integrated circuit chip 4 are generally digital in format.

An analogous chip, generally at 9, also operates for the most part in a digital format, and for purposes of the embodiment in FIG. 2 encompasses peripheral 2, peripheral multiplexer 11, multilevel converter 12, and reference replicator 13. As will become apparent from a further description of the functions performed by the elements in the embodiment, the locations of reference generator 8 and reference replicator 13 can be interchanged with relative ease while retaining the functionality of the invention. Similarly, though the invention depicted in FIG. 2 relates to an embodiment in which data is transferred solely from the processor 1 to peripheral 2, duplication of interface latches 6, current source drivers 7, multilevel converter 12 and peripheral multiplexer 11 would allow data transmission in both directions over I/O bus 3.

The table in FIG. 2 sets forth signal values for an implementation in which current levels generated by current source drivers 7 and decoded by multilevel converter 12 can be defined in analog format to represent multiple digital format data bits, the multiple data bits accumulated from processor 1, and distributed by peripheral 2, by virtue of their higher clock cycle rates. The table exemplifies how current levels on a single line of the bus represent multiple bits of latched digital data, where the current sources provide net current levels of either 0, i/2, i or 3i/2 on a bus line to represent for successive processor generated bits A and B the combinations 00, 01, 10 or 11, respectively.

An important aspect of the invention relates to the fact that the integrated circuit devices on a common integrated circuit chip, whether that be chip 4 or chip 9, share similar fabrication process variations and are subject to the same thermal conditions. As such, the present invention allows for current mode transmission of signals over a bus interconnecting integrated circuit chips while retaining the digital to analog and analog to digital conversion accuracy at both the generating and receiving ends. Differentiation between the multiple levels is accomplished through the use of reference generator 8 and reference replicator 13, the two being related by common reference current $I_{REF}$ on line 14.

Figure 3:
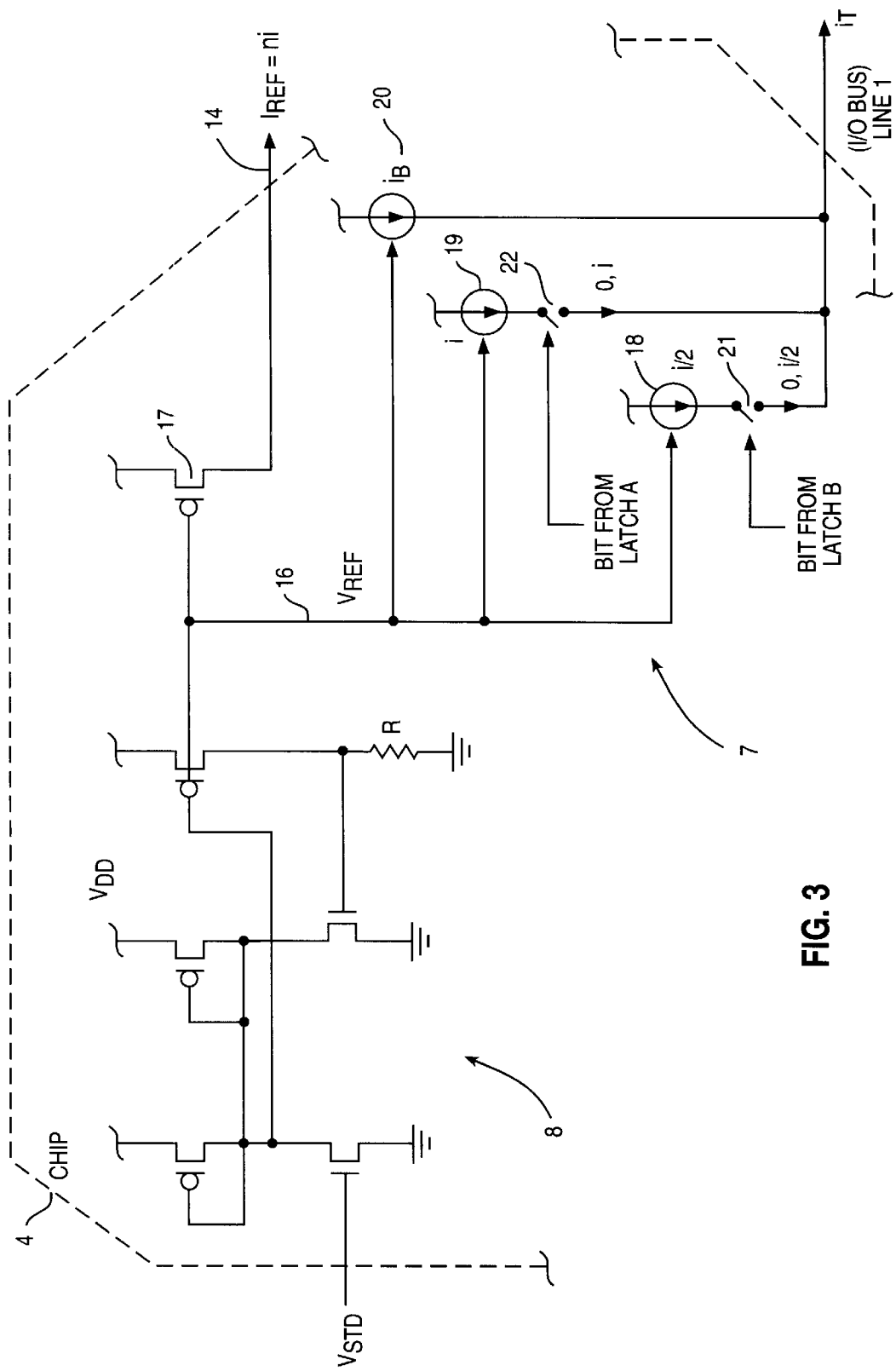
FIG. 3 is a schematic of electronic devices suitable to implement multilevel current source based data transmission over a line of a bus.

FIG. 3 schematically depicts by electronic devices and functional blocks a preferred embodiment of current source driver 7 and reference generator 8. Reference generator 8 utilizes a voltage standard $V_{STD}$, preferably derived off integrated circuit chip 4, to generate on line 16 of integrated circuit 4 a reference voltage $V_{REF}$. The voltage $V_{REF}$ is used on chip 4 to generate accurate incremental values of current i within the context of integrated circuit chip using current mirror connected and dimensionally refined field effect transistors. The presence of the devices on a common integrated circuit chip ensures that the signals generated by the current mirror circuits are accurately related. The $V_{REF}$ on line 16 is applied to field effect transistor 17 to create a current source of fixed value $I_{REF}$, which is also a multiple, mi, ni, of generated currents i, for transmission over line 14 from integrated circuit chip 4 to chip 9 (FIG. 2). The different current magnitudes are derived from transistor size scaling by W/L ratios.

FIG. 3 also depicts the current source drivers for line 1 of I/O bus 3. The current source drivers for line 1 of the bus are composed of switch current source 18 and switch current source 19, where the output of current source 18 is either 0 or i/2, and the output of current source 19 is either 0 or i, depending on the respective states of switches 21 and 22. When the switches 21 and/or 22 are enabled, the currents generated in sources 18 and 19 responsive to the reference voltage $V_{REF}$ are provided in respective magnitudes of i/2 or i output current. Preferably, the current sources are current mirror connected field effect transistors. The states of switches 21 and 22 are defined by the binary value associated with respective bits B and A, the bits being derived from interface latches 6 (FIG. 2). The line 1 current $i_T$ is the net sum of the two currents generated by current sources 18 and 19, with incremental values as shown in the table of FIG. 2 of 0, i/2, i or 3i/2. A preferred design may inject a bias current into line 1 to optimize field effect transistor operational locations for the digital to analog and analog to digital conversions as shown at 20 in FIG. 3.

Current source driver 7 uses the reference signal generated by reference generator 8 to perform the digital to analog conversion between digital bit pair A and B and analog output current $i_T$. Generator 8 also provides the reference current signal $I_{REF}$ to receiving integrated circuit chip 9 to ensure an accurate decode of the analog signal back into digital format. The decoding is accomplished using the circuit in FIG. 4.

Figure 4:
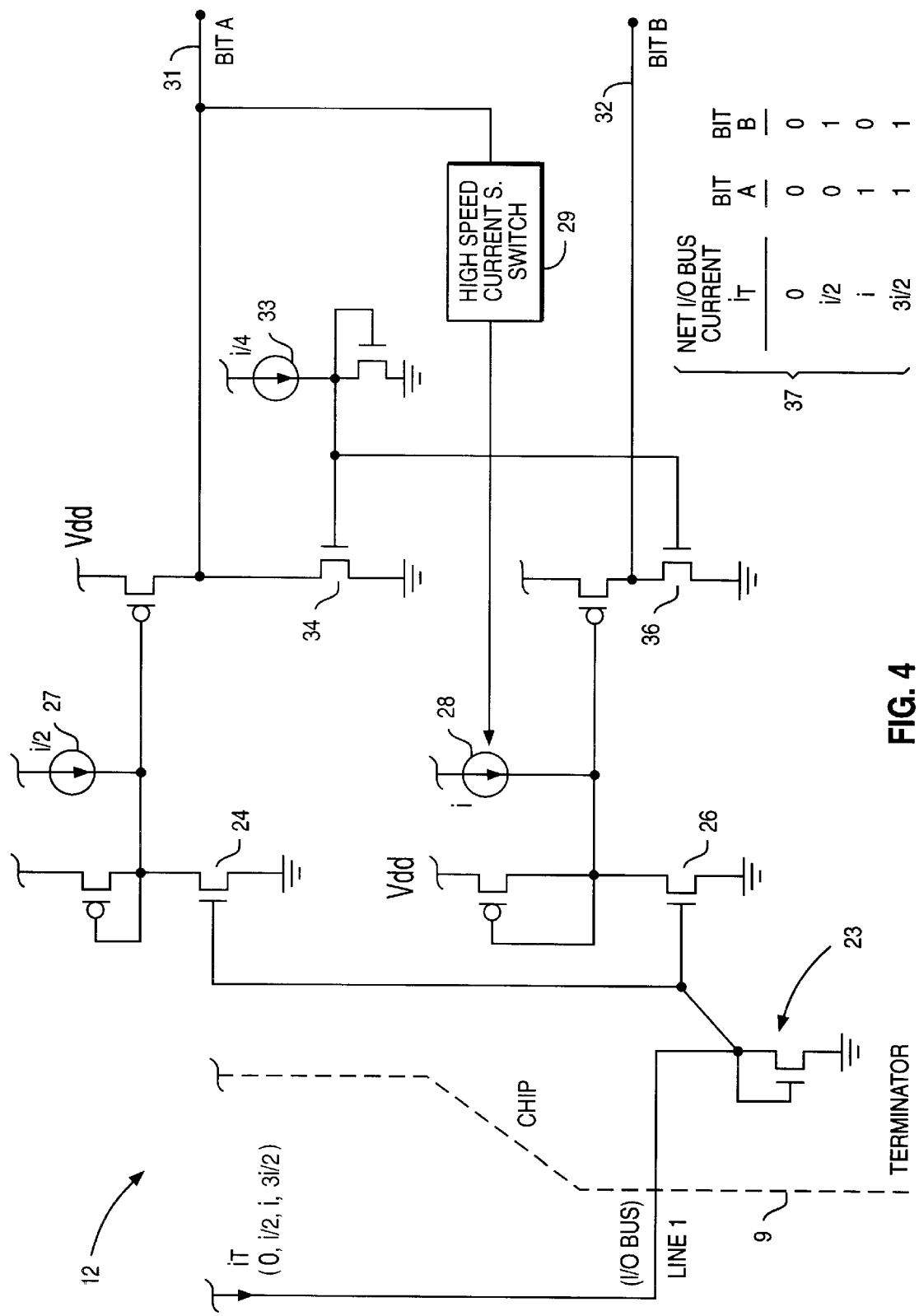
FIG. 4 is a circuit schematic of a multilevel converter suitable to decode multilevel analog currents transmitted over the line of the bus in FIG. 3.

A circuit embodying multilevel converter 12 (FIG. 2) is shown in FIG. 4. The analog format current signal $i_T$ on line 1 of the I/O bus is sunk by active terminator 23. As noted earlier, the magnitude of the current $i_T$ is 0, i/2, i, or 3i/2, generating respective voltages on the terminator and the mirror connected gate electrodes of field transistors 24 and 26. The currents drawn by field effect transistors 24 and 26 are compared in separate channels to currents i/2 and i, generated by current sources 27 and 28. Note that current source 28 is selectively enabled by switch 29 responsive to the binary state of bit A on output line 31. The bit B output on line 32 depends on the current sunk by field effect transistor 26 in relation to the current generated by switched current source 28. Current source 33 provides a bias to center the threshold between the aforementioned levels through the current sinking effects reflected in field effect transistors 34 and 36 as to bits A and B. The table at reference numeral 37 defines the relationships between the analog input current $i_T$ and the binary format values of bits A and B.

Figure 5:
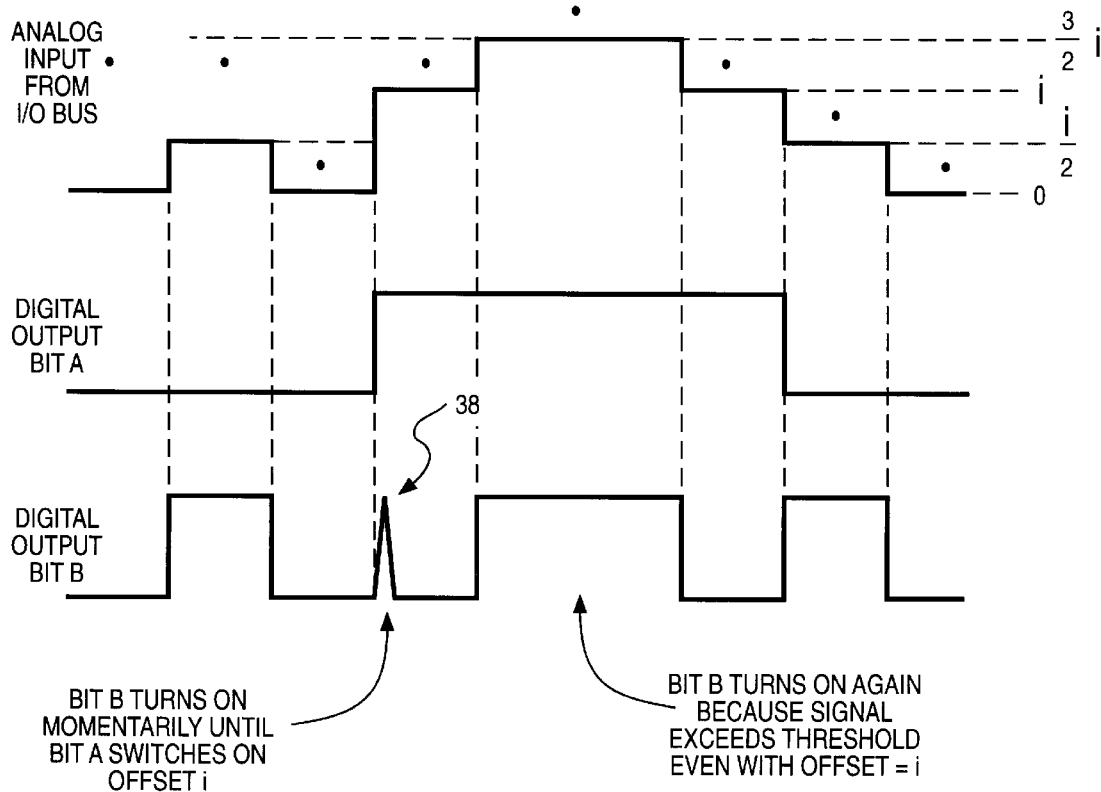
FIG. 5 is a schematic depicting waveforms for time corresponding analog and digital signals.

Given that the binary state of bit B on line 32 is affected by the state of bit A on line 31 through the actions of high speed non-inverting current source switch 29 and switched current source 28, there exists a need to ensure that the final state of bit B is resolved as quickly as possible, nominally a small fraction of the clock cycle. As shown by the waveforms in FIG. 5, a momentary spike, at reference numeral 38, appears on bit B line 32 until bit A switches on current source 28. FIG. 5 also depicts the relative translations of different analog current levels, from line one the I/O bus, into the binary equivalents represented by the combination bits A and B. The analog current levels are shown at the right of the first plot and the equivalent digital outputs are depicted through vertically aligned projections of dashed lines.

Figure 6:
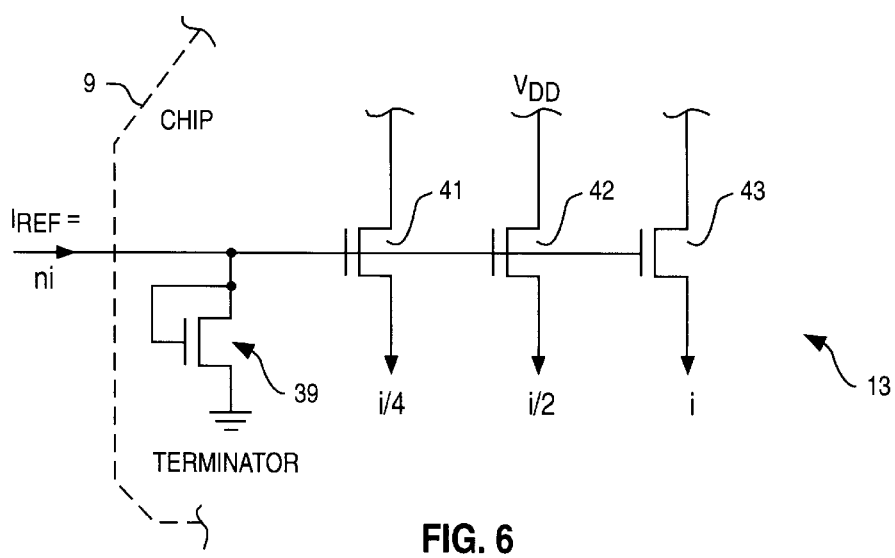
FIG. 6 is a circuit schematic of a reference replicator.

An embodiment of reference replicator 13 (FIG. 2) is shown in FIG. 6. Terminator 39, a field effect transistor device, resides on chip 9, and as such is fabricated at the same time that terminator 23 (FIG. 4) is created. Therefore, the two devices are relatively well matched in their electronic characteristics, as well as being subject to matching thermal conditions. Terminators 23 and 39 can be physically matched to generate corresponding reference voltages when subject to the same currents. When the reference current $I_{REF}$ is established in an amount ni, terminator 39 can be connected to multiple current mirror configured field effect transistors 41, 42 and 43 to define successive current flows of i/4, i/2 and i solely by variations in the field effect transistor channel dimensions. The accurately scaled and replicated currents generated by transistors 41, 42 and 43 are current sources 27, 28 and 33 in FIG. 4 as commonly referenced to current "i", both at processor chip 4 and peripheral chip 9. This way, multilevel converter 12 as particularized in FIG. 4 attains precise differentiation for accurate analog to digital conversion in the context of separate integrated circuit chips and potentially differing environmental conditions.

Figure 7:
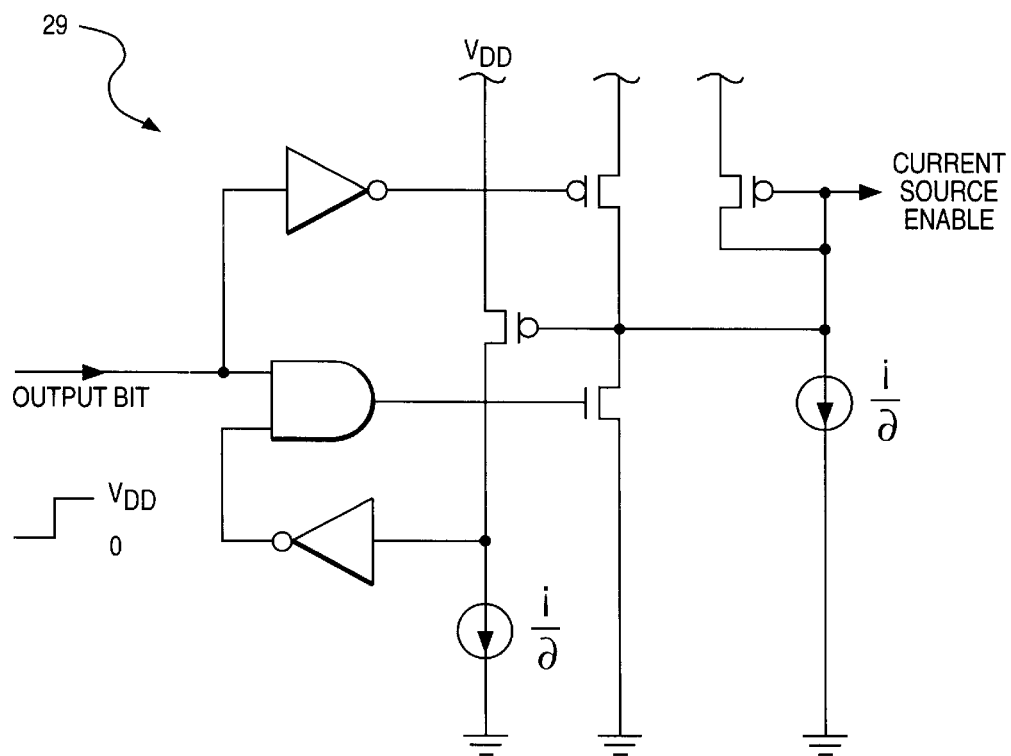
FIG. 7 is a circuit schematic of a high speed current source switch.

High speed current source switch 29 as used to control current source 28 in FIG. 4 is detailed in FIG. 7. For the embodiment of FIG. 4, the bit driving high speed current source switch 29 is bit A, corresponding to line 31 in FIG. 4. The output of switch 29 selectively enables or disables current source 28 and associated current i. The two current sinks used in the embodiment of FIG. 7 are scaled values of the current i to minimize power consumption.

Figure 8:
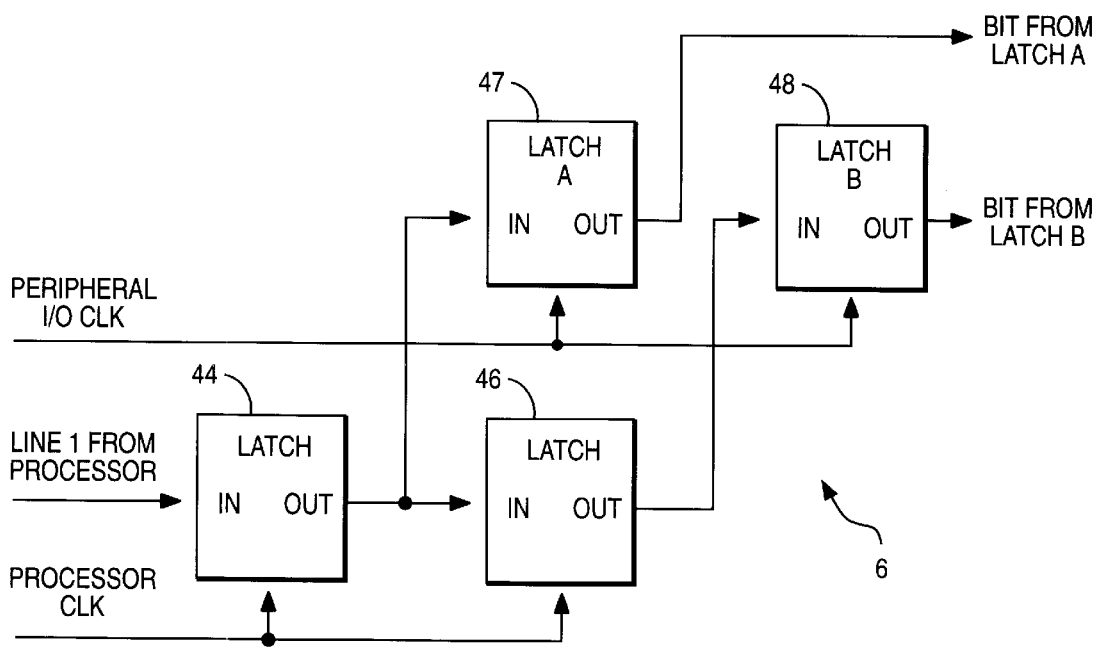
FIG. 8 is a circuit schematic of a clocked latch.

The interface latches in block 6 of FIG. 2 are shown in the embodiment of FIG. 8. The function, performed individually by bus line, is to receive data from the processor over multiple successive clock cycles, to latch the data, and to provide the combination as an input to current source driver 7 for simultaneous digital to analog conversion, a serial to parallel type conversion. As embodied in FIG. 8, line 1 from the processor bus is provided as an input to latch 44, whose output is thereupon provided to latch 46 in processor clocked succession. In conjunction, latches 47 and 48 are synchronized to the I/O clock, which in this embodiment operates at half the processor clock, to receive the outputs from corresponding latches 44 and 46, and in I/O clocked succession to provide as outputs the data representing bit A and bit B, the bits having been the successive binary values on line 1 from the processor. The bits from latches 47 and 48 serve as the enable signals for gates 21 and 22 shown in FIG. 3.

Figure 9:
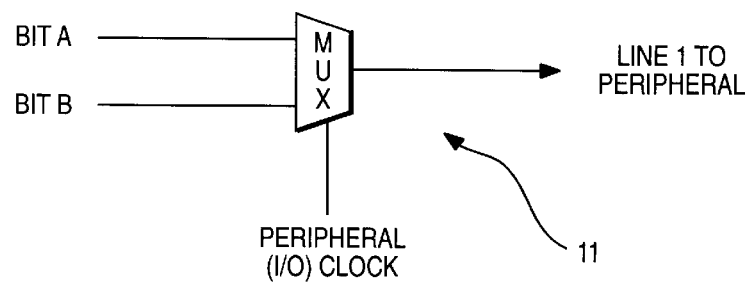
FIG. 9 is a schematic of a peripheral multiplexer.

FIG. 9 depicts the electronic circuit for multiplexer 11 as originally shown in FIG. 2. The multiplexer effectively converts the decoded digital format data from parallel to serial format in keeping with the order originally transmitted from processor 1 (FIG. 2). Multiplexer 11 is responsive to the I/O clock signal, and in the embodiment of FIG. 9 represents the circuit used for one of the multiple bus lines transmitting data between processor 1 and peripheral 2. The processor clock must be generated in synchronization with I/O clock.

Figure 10:
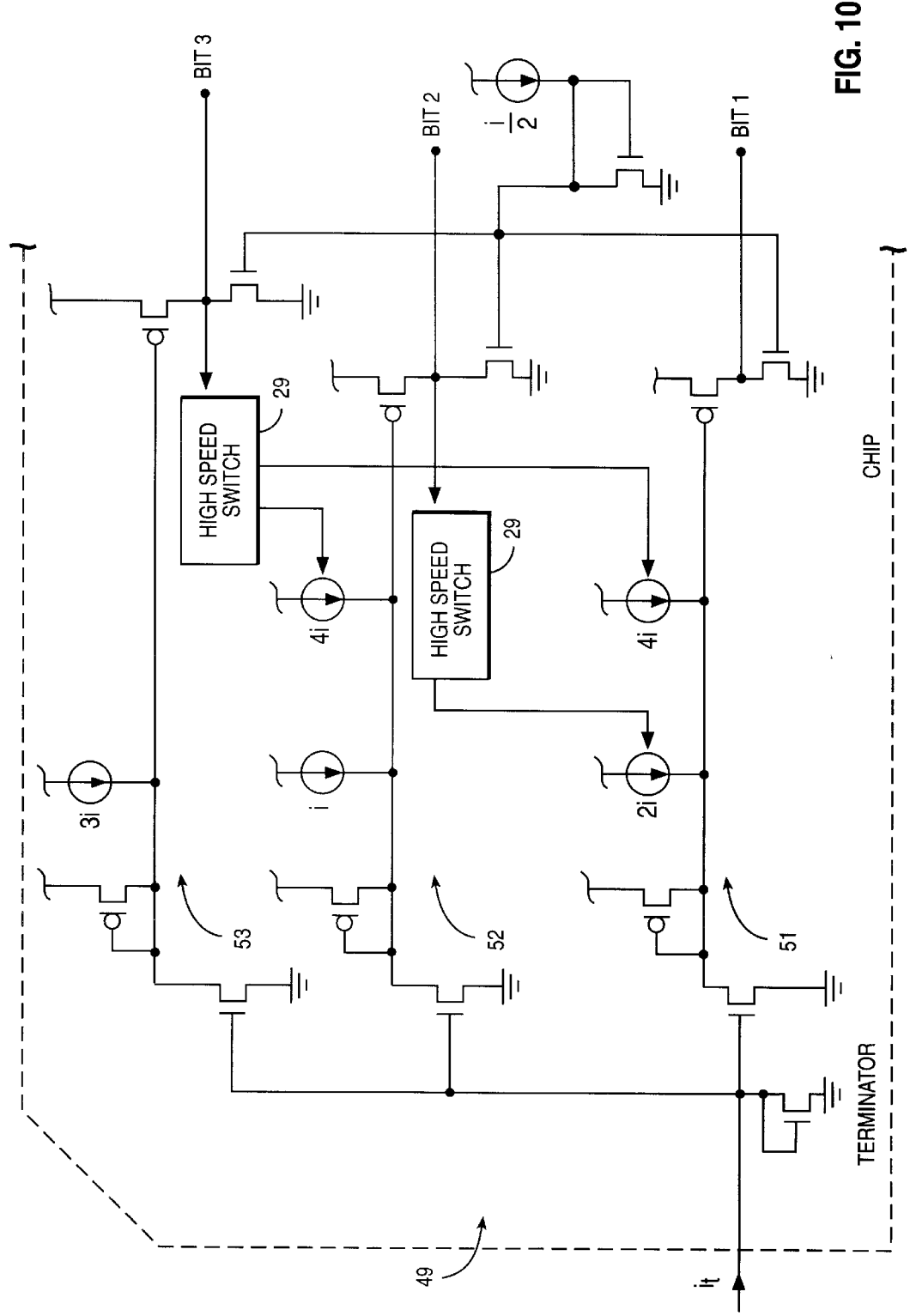
FIG. 10 is a circuit schematic illustrating the architecture of a three-bit multilevel converter.

Multilevel converter 49 as embodied in FIG. 10 illustrates an architecture for a 3-bit multilevel converter. Converter 49 also shows how the basic architecture first described with reference to FIG. 4 may be extended for multiple additional bits through an increase in the number of channels used to perform the comparison, namely, channels 51, 52 and 53, with associated current sources and high speed switches. The basic architecture is particularly unique and valuable in that the comparisons in the various channels 51, 52 and 53 are performed at substantially the same time, and as such cause converter 49 to operate in a manner analogous to a flash converter. The input current $i_T$ is a multilevel analog signal now coded to represent three binary bits, characterized in one of eight discrete levels, and by operation of converter 49 generates binary bit equivalents as represented by output bits 1, 2 and 3. The least significant current step shown here is i, where in the previous embodiment the minimum step was i/2. See Table A. The various current sources are created and switched in keeping with the previously described embodiments, where high speed switch 29 is preferably that depicted in FIG. 7. The fundamental architecture of the embodiment in FIG. 10 is extendable to additional bit levels through the use of more channels, and is amenable decimal magnitudes in selectively switched current sources.

TABLE A

| $i_T$ | BIT 3 | BIT 2 | BIT 1 |
|---|---|---|---|
| 0 | 0 | 0 | 0 |
| i | 0 | 0 | 1 |
| 2i | 0 | 1 | 0 |
| 3i | 0 | 1 | 1 |
| 4i | 1 | 0 | 0 |
| 5i | 1 | 0 | 1 |
| 6i | 1 | 1 | 0 |
| 7i | 1 | 1 | 1 |

Figure 11:
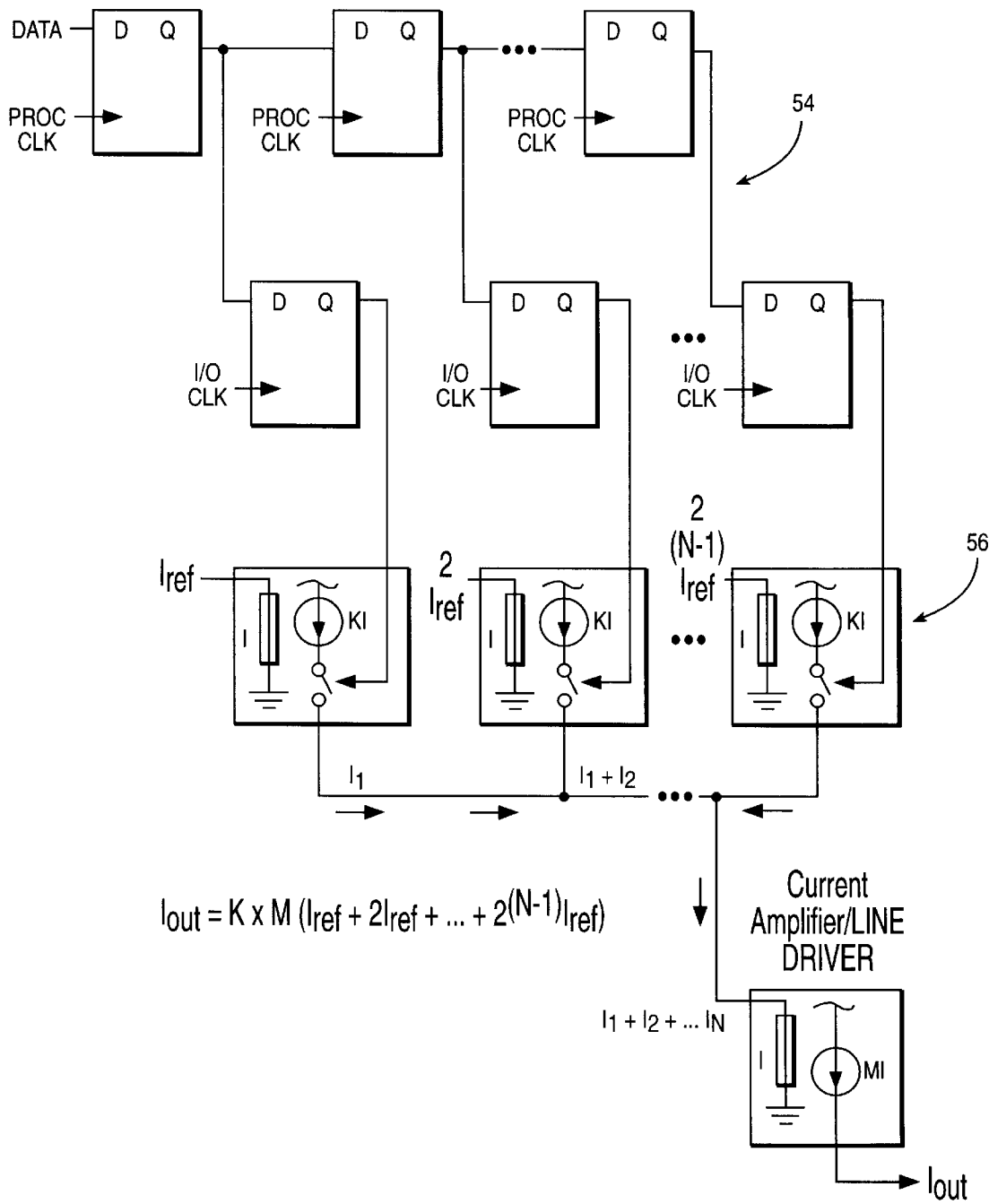
FIG. 11 is a schematic block diagram of a generalized multibit latch and current source driver system.

FIG. 11 schematically depicts a generalized architecture for performing the interface latches and current source driver functions ascribed to blocks 6 and 7 in FIG. 2 for further levels of analog transmission, whereby additional clock cycles of digital format data are accumulated in the latches at 54, individually converted into current source signals at 56, and accumulated as a single net analog current ($I_{out}$) for transmission over a line of the data bus.

The invention is particularly valuable in that it defines a system and method which uses accurately coded and decoded analog currents to simultaneously transmit over a single line multiple digital bits between separate integrated circuit devices, effectively extending the line bandwidth.

It will be understood by those skilled in the art that the embodiments set forth hereinbefore merely exemplary of the numerous arrangements by which the invention may be practiced, and as such may be replaced by equivalents without departing from the invention which will now be defined by appended claims.

We claim:

1. Accentuated transfer rate bus architecture, comprising:
   means for providing digital format signals at a first cycle rate;
   means for latching the digital format signals for multiple successive cycles;
   means for converting latched digital format signals into multilevel analog format signals;
   means for sending the analog format signals from a transmitting end of a bus to a receiving end of the bus, the bus characterized in having a maximum operating frequency materially less than the first cycle rate;
   means for converting analog format signals received from the bus into received digital format signals distributed over multiple successive cycles; and
   reference current transmitted over a reference line connecting the means for converting latched digital format signals to the means for converting analog format signals.

2. The apparatus recited in claim 1, wherein the analog format signals are current source signals.

3. The apparatus recited in claim 1, wherein the means for converting analog format signals received from the bus provides received digital format signals at the first cycle rate.

4. The apparatus recited in claim 2, wherein the means for converting analog format signals received from the bus provides received digital format signals at the first cycle rate.

5. The apparatus recited in claim 3, further comprising a peripheral connected to the receiving end of the bus operating at the first cycle rate.

6. The apparatus recited in claim 4, wherein further comprising a peripheral connected to the receiving end of the bus operating at the first cycle rate.

7. The apparatus recited in claim 1, wherein the means for converting latched digital format signals encodes by generating the currents of incrementally greater amounts for successive stages of binary latched signals.

8. The apparatus recited in claim 2, wherein the means for converting latched digital format signals encodes by generating the currents of incrementally greater amounts for successive stages of binary latched signals.

9. The apparatus recited in claim 5, wherein the means for converting latched digital format signals and the means for converting analog format signals use current mirrors referenced to the reference current transmitted over the reference line.

10. The apparatus recited in claim 6, wherein the means for converting latched digital format signals and the means for converting analog format signals use current mirrors referenced to the reference current transmitted over the reference line.

11. The apparatus recited in claim 7, wherein the means for converting latched digital format signals and the means for converting analog format signals use current mirrors referenced to the reference current transmitted over the reference line.

12. The apparatus recited in claim 8, wherein the means for converting latched digital format signals and the means for converting analog format signals use current mirrors referenced to the reference current transmitted over the reference line.

13. A method of communicating digital format signals generated at a first cycle rate over a bus having a maximum operating frequency materially less than the first cycle rate, comprising the steps of:
   latching the digital format signals generated at the first cycle rate for multiple successive cycles;
   converting the latched digital format signals into a multilevel analog format signals;
   sending the analog format signals from a transmitting end of the bus to a receiving end of the bus;
   converting analog format signals received from the bus into received digital format signals distributed over multiple successive cycles; and
   transmitting a reference current in a reference line extending between the transmitting end of the bus and the receiving end of the bus.

14. The method recited in claim 13, wherein the analog format signals are current source signals.

15. The method recited in claim 14, wherein the converted analog format signals provide received digital format signals at the first cycle rate.

16. A bus architecture for connecting a processor to a peripheral, comprising:
   a processor providing digital signals at a first cycle rate;
   means for latching the digital format signals for multiple successive cycles;
   means for converting latched digital format signals into multilevel analog format signals;
   means for sending the analog format signals from a transmitting end of a bus to a receiving end of the bus, the bus characterized in having a maximum operating frequency materially less than the first cycle rate;
   means for converting analog format signals received from the bus into received digital format signals distributed over multiple successive cycles;
   reference current flowing in a reference line connecting the means for converting latched digital format signals to the means for converting analog format signals; and
   a peripheral connected to receive the received digital format signals at the receiving end of the bus.

17. The apparatus recited in claim 16, wherein the analog format signals are current source signals.

18. The apparatus recited in claim 16, wherein the means for converting analog format signals received from the bus provides received digital format signals at the first cycle rate.

19. The apparatus recited in claim 17, wherein the means for converting analog format signals received from the bus provides received digital format signals at the first cycle rate.

20. The apparatus recited in claim 18, wherein the peripheral operates at the first cycle rate.

21. The apparatus recited in claim 19, wherein the peripheral operates at the first cycle rate.

* * * * *